United States Patent [19]

Kaplan

[11] 4,099,453
[45] Jul. 11, 1978

[54] COFFEE-MAKER ASSEMBLY
[76] Inventor: Steven Kaplan, 71 Driftwood Dr., Port Washington, N.Y. 11050
[21] Appl. No.: 789,103
[22] Filed: Apr. 20, 1977
[51] Int. Cl.² .................... A47J 31/02; A47J 31/10
[52] U.S. Cl. .................................................... 99/306
[58] Field of Search ................. 99/295, 298, 299, 306, 99/305, 304

[56] References Cited
U.S. PATENT DOCUMENTS

| 3,086,447 | 4/1963 | Arnett | 99/295 |
| 3,479,949 | 11/1969 | Reynolds | 99/295 |
| 3,985,069 | 10/1976 | Cavalluzzi | 99/295 |

*Primary Examiner*—Robert W. Jenkins
*Attorney, Agent, or Firm*—Michael Ebert

[57] ABSTRACT

A free-standing coffee-maker assembly including a brewing basket that is seated on a decanter, a paper filter having a flat base being nested within the basket. Boiling water from a reservoir seated on the basket is sprayed over a bed of ground coffee lying over the flat base of the filter, the water percolating through the bed to produce a coffee extract which is discharged through a central opening in the bottom of the basket into the decanter. The bottom of the basket is provided with a depressed region surrounding the central opening to define a well and an annular inactive zone concentric therewith. The well is provided with upstanding ribs to maintain a space between the base of the filter and the well, whereby the coffee extract is free to flow through the filter base only in the region thereof overlying the well. This restriction in the filtering action renders the assembly effective throughout a broad operating range so that the same assembly and same sized filter may be used to brew a large amount of beverage or a much smaller amount.

9 Claims, 6 Drawing Figures

U.S. Patent
July 11, 1978    Sheet 1 of 2    4,099,453
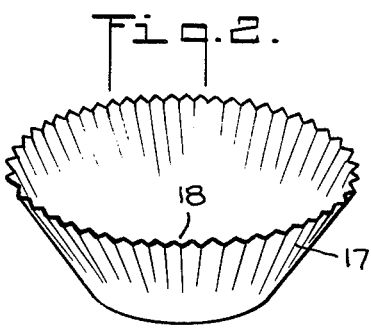
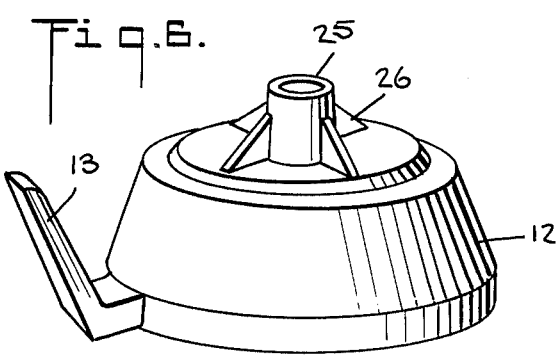
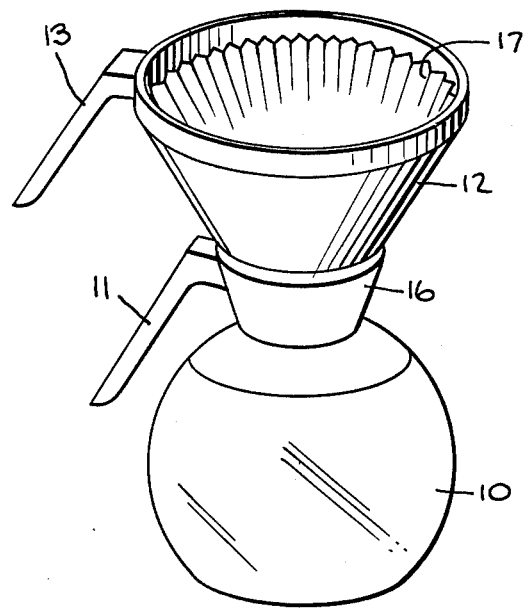
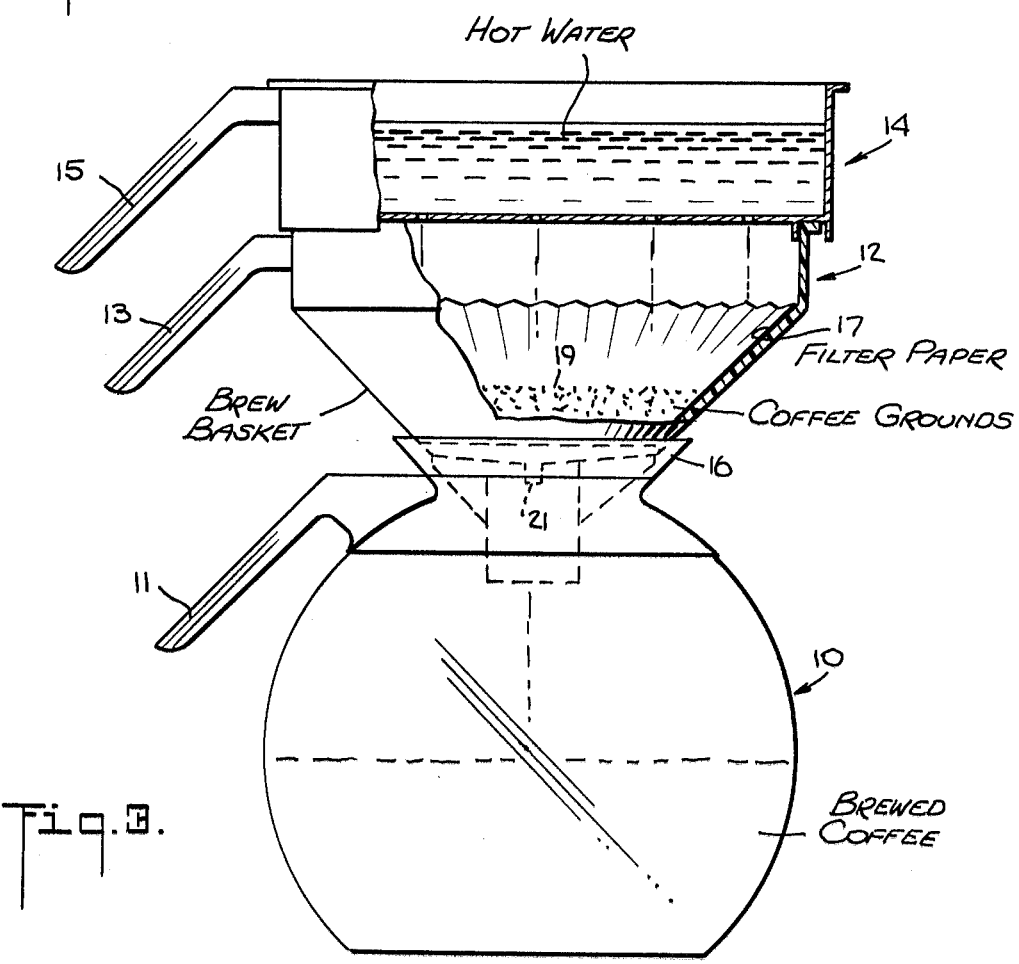

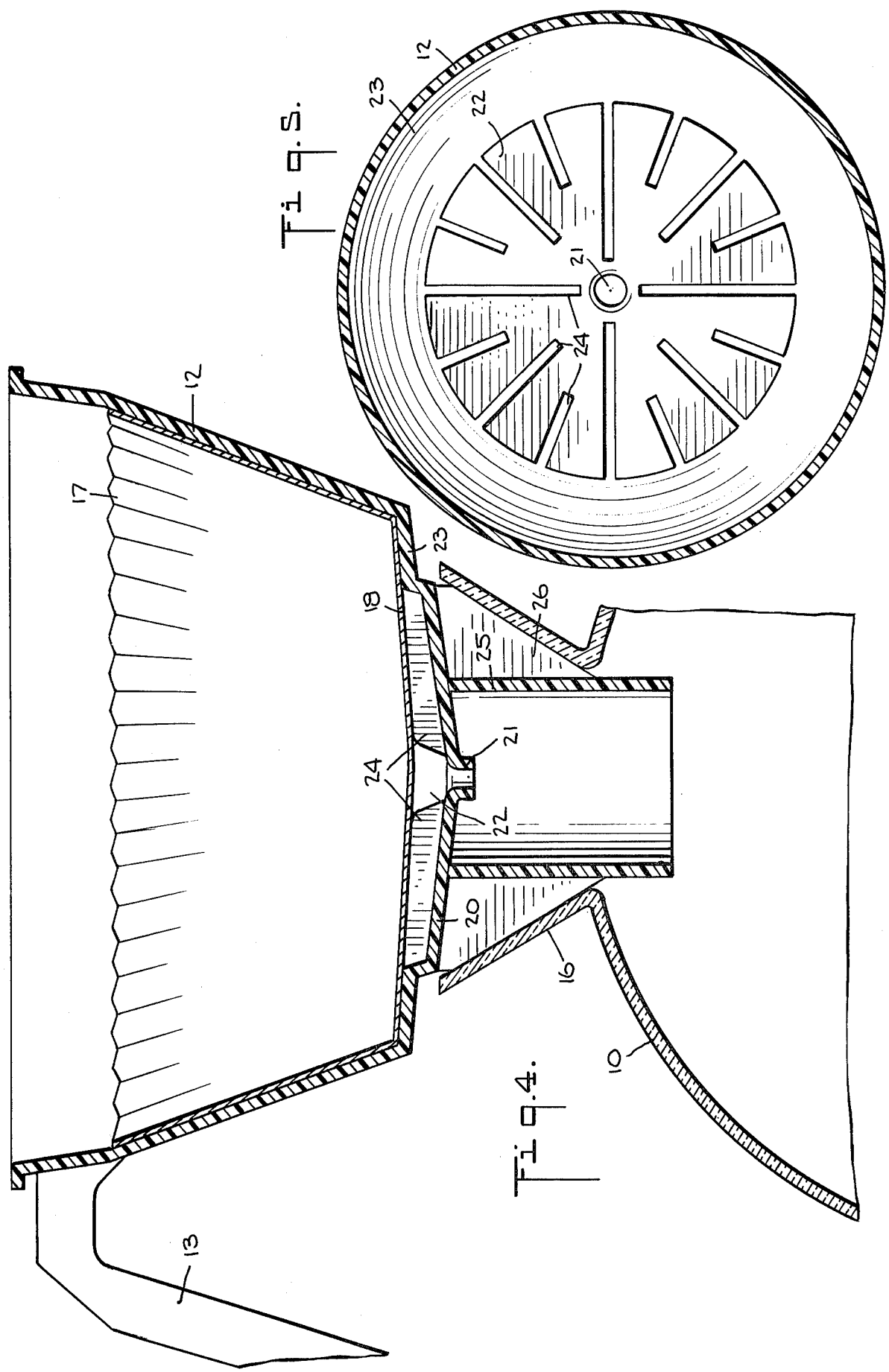

COFFEE-MAKER ASSEMBLY

BACKGROUND OF INVENTION

This invention relates generally to coffee-makers of the paper filter type and more particularly to a free-standing coffee-maker assembly which has a large maximum capacity and yet is capable of effectively brewing coffee within a broad operating range.

Coffee-makers are known which are of the so-called pour-over paper-filter type. One such maker on the market is the Silex coffeebrewer which is disclosed in Silex U.S. Pat. No. Des. 201,949, the maker including a stand serving to raise a water reservoir above a funnel functioning as a brewing chamber below which is placed a coffee decanter.

In the Silex coffee-maker, a bed of ground coffee is formed in a disposable paper filter nested within the funnel, boiling water contained in the reservoir being discharged through a nozzle which is adapted to spray the water so that it is distributed over the entire bed of coffee grounds. The brewed beverage resulting from the infusion process which takes place in the brewing chamber is fed into the coffee decanter.

The throw-away paper filter nested within the funnel in the Silex coffee-maker has a frusto-conical form, with a pleated wall and a flat base to provide a large filtering area. In the coffee-maker disclosed in the Martin U.S. Pat. No. 3,374,897, use is made of a similarly-shaped paper filter and a stand-supported funnel; but to physically separate the flat base of the filter from the bottom of the funnel, the funnel bottom includes upstanding radial ribs to define a space below the filter permitting the free flow of the coffee extract to a central discharge port.

The maximum capacity of a coffee-maker of the type shown in the Silex and Martin patents is fixed by the size of the brew basket or funnel and the complementary size of the paper filter; for these sizes determine the volume of ground coffee that can be contained therein. If, therefore, the parameters of the funnel and filter are such as to provide the coffee-maker with a 12-cup capacity, this amount of coffee extract will be produced when the volume of ground coffee in the basket is sufficient for this purpose and an adequate amount of water is poured over the ground coffee bed.

The boiling water sprayed on the bed of ground coffee percolates through the bed in a single pass, the rate of percolation being determined by the volume and grind of the ground coffee and the flow characteristics of the filter. Thus for a given grind, the greater the volume of the ground coffee bed, the slower is the rate of percolation and the greater the infusion action. In practice, these variables are chosen to provide for a given rated coffee-maker capacity a coffee extract of acceptable quality. However, with known coffee makers of the paper filter type, the maker is incapable of functioning effectively when used to produce an amount of brewed coffee much below the rates maximum capacity of the maker.

Thus while a 12-cup capacity coffee-maker will also function effectively to produce 10 cups, in that the volume of ground coffee for a 10-cup output is not much less than for a 12-cup output, if one tries to use the same maker to brew, say, only four or five cups of coffee, then the resultant coffee extract will be weak or of poor quality. The reason for this is that to produce a four-cup output, one must use a relatively small volume of ground coffee, as a result of which the water percolates through the bed at too rapid a rate and proper infusion is not obtained.

In the typical household, it is the practice to purchase a coffee-maker which is suitable for the largest anticipated requirement, say, a party of 10 or 12. Since on most occasions the actual demand for coffee is limited to the number of people who make up the household, which is rarely greater than six, a large capacity coffee-maker of the type heretofore known has limited utility; for its use is reserved for those relatively rare occasions which call for the full capacity of the maker. For everyday use, the householder must therefore purchase a small capacity coffee-maker which operates in, say, the three-to-five-cup range.

SUMMARY OF INVENTION

In view of the foregoing, it is the main object of this invention to provide a coffee-maker assembly of the paper filter type which makes it possible to brew coffee of good quality throughout a broad operating range.

More particularly, it is an object of this invention to provide a free-standing assembly of the above type in which the brewing basket within which the paper filter is nested is seated on a decanter for the brewed beverage and in which the reservoir for spraying water over the bed of ground coffee contained within the filter is seated on the basket, thereby obviating the need for a stand as well as substantially reducing the cost of the maker and minimizing of its space requirements.

A significant advantage of the invention resides in the use of a paper filter having a frusto-conical form and a flat base in combination with a basket adapted to restrict flow through the filter to the central region thereof, whereby, though the size of the filter is large enough to accommodate a bed of ground coffee sufficient in volume for the maximum rated capacity of the assembly, the same filter may be effectively used with a much smaller bed sufficient in volume for the minimum rated capacity of the assembly; for at either end of the scale, the rate of percolation through the bed is such as to produce a good quality beverage.

Briefly stated, these objects are attained in a free-standing coffee-maker assembly constituted by a decanter for the beverage, a brewing basket and a water reservoir, a paper filter having a frusto-conical and flat base being nested within the basket, the reservoir being seated on the basket which is seated in the decanter.

Boiling water from the reservoir is sprayed over the bed of ground coffee formed within the filter, the water percolating through the bed to produce a coffee extract which is discharged through a central opening in the bottom of the basket into the decanter. The bottom of the basket is provided with a depressed region surrounding the central opening to define a well and an annular inactive zone concentric therewith.

The well is provided with upstanding ribs to maintain a space below the base of the filter and the well, whereby the coffee extract is free to flow through the filter base only in the region thereof overlying the well. This restriction in the filtering action renders the assembly effective throughout a broad operating range so that the same assembly and the same sized filter may be used to brew a large amount of the beverage or a much smaller amount.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a coffee-maker assembly in accordance with the invention, the water reservoir being omitted to expose the paper filter nested within the brew basket;

FIG. 2 is a separate showing of the paper filter;

FIG. 3 is an elevational view of the coffee-maker assembly, partly cut away;

FIG. 4 is a sectional view taken through the brew basket;

FIG. 5 is a plan view of the interior of the brew basket; and

FIG. 6 is a perspective view of the brewing basket shown upside down.

DESCRIPTION OF INVENTION

Referring now to the drawings, there is shown a coffee-maker assembly in accordance with the invention whose three components are a bowl or decanter 10 having a handle 11, a brewing basket 12 seated on the decanter 10 and having a handle 13, and a reservoir 14 seated on the brewing basket 12 and having a handle 15.

Decanter 10 is preferably made of high-temperature glass, so that after it is filled with brewed coffee, it may be placed on a hot plate or other heater to maintain the beverage at the desired temperature. The maximum capacity of decanter 10 is the maximum rated capacity of the assembly; hence for an assembly having a four-to-12-cup capacity, the decanter has a 12-cup capacity. Decanter 10 is provided with a funnel-shaped mouth 16.

Brewing basket 12, which may be made of a transparent or opaque plastic material that is non-reactive with brewed coffee and is capable of withstanding the temperatures involved, has a frusto-conical shape that matches the frusto-conical form of a disposable paper filter 17 nested within the basket. Filter 17, whose side wall is pleated, is provided with a flat base 18, the filter containing a charge of ground coffee in a volume appropriate to the number of cups to be brewed, thereby forming a ground coffee bed 19.

Bottom wall 20 of basket 12 is sloped downwardly toward a central outlet 21. Wall 20 is provided with a circular depression surrounding outlet 21 to define a well 22 and an annular inactive zone 23 concentric therewith. The interior of basket 12 is smooth, and the paper filter nested therein, which lies against the side wall and annular zone 23, is effectively rendered impermeable to liquid except for the region on the base 18 of the filter which overlies well 23.

To maintain a free space below filter base 18 in the region thereof overlying well 22, the well is provided with an array of upstanding radial ribs 24 in the pattern shown in FIG. 5, where it will be seen that the ribs at the 0°, 90°, 180° and 270° positions are longest and extend from the periphery of the well to outlet 21 to define quadrants, whereas the three ribs within each quadrant are formed by a 45° rib of intermediate length and a pair of shorter ribs on each side thereof.

The free well space is formed by the array of ribs which permits flow restricted to the region of the filter base overlying the well. In this way, the rate of percolation through the bed of ground coffee is controlled so that even though the bed is of small volume in an amount just sufficient to produce the minimum number of cups at the low end of the operating range, the water passage through the filter is restrained to permit adequate time for infusion to take place within the brewing basket.

However, the area of the restricted filter region is sufficient to permit percolation through a bed of large volume appropriate to the upper end of the operating range without unduly restricting the flow from the brewing basket into the decanter. Thus while the size of the basket is such as to receive a paper filter large enough to accommodate a bed of ground coffee yielding an output according to the maximum rating of the maker, the same filter may be used effectively for a much smaller output. And while as an example we have cited an operating range of four to 12 cups, it will be appreciated that the principles underlying the invention are fully applicable to a coffee-maker assembly having a two-cup to six-cup range, or to one having a 12-to-24 cup range.

It is also to be understood that the area of the restricted region of the filter represents a compromise between the optimum region for the lowest end of the scale and the optimum region for the highest end, and that the operating range is therefore not unlimited and must be kept within reasonable limits. Thus the active filter region cannot be so restricted as to permit the maker to produce a two-cup minimum, for a region so restricted will be unduly so for a 12-cup maximum.

In order for basket 12 to nest securely within the decanter, the basket is provided with an outlet tube 25 coaxial with outlet 21, the tube being buttressed by an array of wedge-shaped fins 26 whose slope matches the slope of the funnel-shaped mouth 16 of the decanter so that the basket is seated stably within the decanter.

Reservoir 14 is optional; for when the assembly is used at less than its maximum capacity, one may dispense with the reservoir and pour hot water directly into the basket. Rim 27 of the base of the reservoir has a channel formation so that the lip of the basket is received therein to provide a stable coupling. The reservoir may be provided with a perforated base to spray the water on the bed of ground coffee, or with a nozzle of the type used in the Silex coffee-maker to afford a uniform dispersion of the water.

In practice, the user of the assembly first places the paper filter into the brewing basket, after which he fills the filter with ground coffee to a level appropriate to the number of cups he intends to brew. Then the basket is seated on top of the empty decanter and the empty reservoir is seated on top of the basket.

Water brought to a boil in a kettle is poured into the reservoir and is showered thereby onto the bed of ground coffee in the basket to cause infusion, yielding a coffee extract which is discharged into the decanter. Brewing is completed when there is no further discharge into the decanter, at which point one removes the reservoir and the basket and discards the filter with the wet grounds therein. The brewed coffee in the decanter is now ready to be served, or it may be placed on a warming plate to maintain it at the proper temperature.

While there has been shown and described a preferred embodiment of a coffee-maker assembly in accordance with the invention, it will be appreciated that many changes and modifications may be made therein without, however, departing from the essential spirit thereof. Thus instead of ribs, the web may be covered by a grid to support the base of the filter to maintain a free space therebelow.

I claim:

1. A coffee maker assembly having a large maximum capacity rating for brewing coffee, the same assembly being effective in brewing coffee in an amount much below the maximum rating, comprising:

A. a decanter for containing the brewed coffee and for maintaining it at a desired temperature;

B. a disposable paper filter having a frusto-conical form and a flat base on which is formed a bed of ground coffee to be sprayed by boiling water to cause infusion resulting in brewed coffee; and C. a basket seated on the decanter and having a corresponding frusto-conical form to nest said filter, the base of said filter resting on the bottom of said basket, the bottom of said basket having a central opening through which the brewed coffee passing through the base of said filter is discharged into said decanter, said bottom having a central depressed region surrounding said opening to define a well underlying a restricted central region of said base and an inactive annular zone concentric therewith in contact with a corresponding annular region of said base, whereby said filter is active only in the restricted central region overlying said well and is effective to control the rate of percolation necessary to brew coffee of good quality regardless of the volume of ground coffee forming said bed.

2. An assembly as set forth in claim 1, further including a water reservoir seated over said basket.

3. An assembly as set forth in claim 2, wherein said decanter, said basket and said reservoir are each provided with a handle.

4. A coffee-maker assembly as set forth in claim 1, wherein said basket further includes upstanding ribs in said well to support the restricted region of said filter base which is loaded with ground coffee and to assure a free space therebelow.

5. An assembly as set forth in claim 1, wherein said decanter is provided with a funnel-shaped mouth.

6. An assembly as set forth in claim 5, wherein said basket is provided with an outlet tube coaxial with said central opening and an array of wedged-shaped fins buttressing said tube and conforming to the slope of said mouth to stably seal said basket on said decanter.

7. An assembly as set forth in claim 1, wherein the interior of said basket is smooth and is engaged by the wall of said paper filter whereby flow through said filter is confined to said region thereof.

8. In a coffee-maker, a basket having a frusto-conical form adapted to nest a disposable paper filter having a corresponding from and a flat base on which is loaded a bed of ground coffee to be sprayed by boiling water to cause infusion resulting in brewed coffee; said basket having a bottom provided with a central opening through which the brewed coffee is discharged, said bottom having a depressed region surrounding said opening to define a well underlying a restricted central region of the filter base and an inactive annular zone concentric therewith in contact with a corresponding annular region of said base, whereby the filter is active only in the restricted region overlying said well.

9. A basket as set forth in claim 8, wherein said well is provided with means to support the base of the filter to maintain a free space therebelow.

* * * * *